US011485888B2

(12) United States Patent
Choi et al.

(10) Patent No.: US 11,485,888 B2
(45) Date of Patent: Nov. 1, 2022

(54) SILICONE PRESSURE-SENSITIVE ADHESIVE COMPOSITION

(71) Applicant: DOW SILICONES CORPORATION, Midland, MI (US)

(72) Inventors: Ho-Jin Choi, Seoul (KR); Sun-Hee Kim, Uijeongbu-si (KR); Min-Cheol Jeon, Seoul (KR)

(73) Assignee: DOW SILICONES CORPORATION, Midland, MI (US)

( * ) Notice: Subject to any disclaimer, the term of this patent is extended or adjusted under 35 U.S.C. 154(b) by 384 days.

(21) Appl. No.: 16/641,003

(22) PCT Filed: Aug. 16, 2018

(86) PCT No.: PCT/KR2018/009370
§ 371 (c)(1),
(2) Date: Feb. 21, 2020

(87) PCT Pub. No.: WO2019/039789
PCT Pub. Date: Feb. 28, 2019

(65) Prior Publication Data
US 2021/0009877 A1 Jan. 14, 2021

(30) Foreign Application Priority Data
Aug. 25, 2017 (KR) .......................... 10-2017-0108149

(51) Int. Cl.
*C08G 77/20* (2006.01)
*C09J 183/04* (2006.01)
*C09J 7/38* (2018.01)
*C08G 77/08* (2006.01)
*C08G 77/12* (2006.01)
*C08K 5/05* (2006.01)
*C08K 5/56* (2006.01)

(52) U.S. Cl.
CPC ............ *C09J 183/04* (2013.01); *C08G 77/08* (2013.01); *C08G 77/12* (2013.01); *C08G 77/20* (2013.01); *C08K 5/05* (2013.01); *C08K 5/56* (2013.01); *C09J 7/38* (2018.01); *C09J 2301/302* (2020.08); *C09J 2483/00* (2013.01)

(58) Field of Classification Search
CPC ........ C08G 77/12; C08G 77/20; C08G 77/70; C08L 83/04; C09J 183/04
See application file for complete search history.

(56) References Cited

U.S. PATENT DOCUMENTS

| | | | |
|---|---|---|---|
| 5,248,739 A * | 9/1993 | Schmidt .................. | C08L 83/00 428/447 |
| 5,597,648 A | 1/1997 | Hanneman et al. | |
| 2005/0282977 A1 | 12/2005 | Stempel et al. | |
| 2007/0009748 A1 | 1/2007 | Takanami et al. | |
| 2010/0104865 A1 | 4/2010 | Mizuno et al. | |
| 2010/0168313 A1 | 7/2010 | Mizuno et al. | |
| 2013/0330562 A1 | 12/2013 | Irifune et al. | |
| 2015/0275060 A1 | 10/2015 | Kuroda et al. | |
| 2016/0053148 A1 | 2/2016 | Tsuchida | |
| 2017/0145256 A1 | 5/2017 | Huang et al. | |
| 2017/0342677 A1 | 11/2017 | Uno et al. | |

FOREIGN PATENT DOCUMENTS

| | | |
|---|---|---|
| CN | 1845968 A | 10/2006 |
| CN | 102516924 | 6/2012 |
| CN | 103484017 A | 1/2014 |
| EP | 0255226 A2 | 2/1988 |
| EP | 2842740 A1 | 3/2015 |
| JP | S638470 A | 1/1988 |
| JP | H05214303 A | 8/1993 |
| JP | H08209104 A | 8/1996 |
| JP | 2002285129 A | 10/2002 |
| JP | 2008156497 A | 7/2008 |
| JP | 3166787 U | 3/2011 |
| WO | 2005021652 A1 | 3/2005 |
| WO | 2015196400 A1 | 12/2015 |

(Continued)

OTHER PUBLICATIONS

Machine assisted English translation of CN102516924A obtained from https://worldwide.espacenet.com on Jun. 19, 2021, 14 pages.
International Search Report for PCT/KR2018/009370 dated Nov. 19, 2018, 3 pages.
Machine assisted English translation of JP3166787U obtained from https://patents.google.com/patent on Feb. 20, 2020, 9 pages.
Viachine assisted English translation of JPH08209104A obtained from https://patents.google.com/patent on Jul. 28, 2022, 6 pages.
Machine assisted English translation of JP2002285129A obtained from https://patents.google.com/patent on Jul. 28, 2022, 8 pages.

*Primary Examiner* — Kuo Liang Peng
(74) *Attorney, Agent, or Firm* — Warner Norcross + Judd LLP

(57) ABSTRACT

A silicone pressure-sensitive adhesive composition is disclosed. The composition can be cured into a pressure-sensitive adhesive having a good release force against a release liner and a high peel force against several substrates. The silicone pressure-sensitive adhesive composition comprises: (A) a diorganopolysiloxane having on average at least 0.5 alkenyl groups with 2 to 12 carbon atoms per molecule; (B) an organopolysiloxane composed of $R^1_3SiO_{1/2}$ and $SiO_{4/2}$ units, wherein each $R^1$ represents a monovalent hydrocarbon group with 1 to 12 carbon atoms, having a molar ratio ($R^1_3SiO_{1/2}$ unit)/($SiO_{4/2}$ unit) of 0.6 to 1.7, and having a number average molecular weight (Mn) converted to standard polystyrene of from 1,700 to 3,000; (C) an organohydrogenpolysiloxane having on average at least two silicon-bonded hydrogen atoms per molecule; and (D) a hydrosilylation catalyst.

6 Claims, No Drawings

(56) References Cited

FOREIGN PATENT DOCUMENTS

WO     2016063693 A1    5/2017
WO     2017106087 A1    6/2017

\* cited by examiner

SILICONE PRESSURE-SENSITIVE ADHESIVE COMPOSITION

CROSS-REFERENCE TO RELATED APPLICATIONS

This application is the National Stage of International Appl. No. PCT/KR2018/009370 filed on 16 Aug. 2018, which claims priority to and all advantages of Korean Appl. No. 10-2017-0108149 filed on 25 Aug. 2017, the content of which is hereby incorporated by reference.

TECHNICAL FIELD

The present invention relates to a silicone pressure-sensitive adhesive composition.

BACKGROUND ART

As compared to acrylic pressure-sensitive adhesive compositions, silicone pressure-sensitive adhesive compositions are superior to the former in their electrical-insulation properties, resistance to heat, resistance to frost, and adhesion to various substrates. Therefore, the silicone pressure-sensitive adhesive compositions find application in the production of such goods as heat-resistant adhesive tapes, electrically insulating adhesive tapes, heat-seal tapes, masking tapes for metal plating, etc. In terms of mechanisms of curing, the silicone pressure-sensitive adhesive compositions can be divided into compositions curable by an addition reaction, condensation reaction, or a radical reaction with the use of organic peroxide, of which the silicone pressure-sensitive adhesive compositions curable by an addition reaction find more common application since they can be cured by merely retaining them at room temperature or by heating for acceleration of curing. Another advantage of these compositions is that they do not form by-products.

U.S. Pat. No. 5,248,739 discloses an addition reaction-silicone pressure-sensitive adhesive composition provides high tack and peel adhesion to low surface energy substrates such as polyolefins and polytetrafluoroethylene, wherein the curable silicone pressure-sensitive adhesive composition comprises: (A) 60 to 90 parts by weight of an organopolysiloxane resin having a number average molecular weight (Mn) value of about 950 to 1,600 and consisting essentially of $R_3SiO_{1/2}$ siloxane units and $SiO_{4/2}$ siloxane units, wherein each R represent a monovalent hydrocarbon group and the mole ratio of $R_3SiO_{1/2}$ siloxane units to $SiO_{4/2}$ siloxane units in the organopolysiloxane having a value of from 1.1 to 1.4; (B) 10 to 40 parts by weight of a diorganopolysiloxane having at least two alkenyl groups per molecule; (C) an organohydrogenpolysiloxane having on average at least two silicon-bonded hydrogen atoms per molecule, in a sufficient amount to provide from 1 to 30, preferably 1 to 10 of silicon-bonded hydrogen atoms per alkenyl groups in the total of components (A) and (B), namely SiH/alkenyl group ratio; and (D) a catalyst amount of a platinum group metal-containing catalyst.

U.S. Pat. No. 5,248,739 also discloses the silicone pressure-sensitive adhesive composition having SiH/alkenyl group ratio of 3, comprising organopolysiloxane resin having Mn of from 1,700 to 3,000, e.g., Resin M (Mn=1,832), Resin N (Mn=1,841), and Resin O (Mn=2,322) as comparative organopolysiloxane resins, can not provide high tack and peel adhesion to substrates.

However, it was found that the organopolysiloxane resin having Mn of 1,700 to 3,000 can provide a pressure-sensitive adhesive composition having a high SiH/alkenyl group ratio with good peel adhesion and high tack to general substrates such as glass, polycarbonate (PC) and polyethylene terephthalate (PET).

PRIOR ART REFERENCE

Patent Reference (Patent Document 1) U.S. Pat. No. 5,248,739 A

DISCLOSURE OF INVENTION

Technical Problem

An object of the present invention is to provide a silicone pressure-sensitive adhesive composition which can be cured into a pressure-sensitive adhesive having a good release force against a release liner, a high tackiness and a high peel adhesion against the general substrates such as glass, PC and PET.

Solution to Problem

The silicone pressure-sensitive adhesive composition of the present invention comprises:

(A) a diorganopolysiloxane having on average at least 0.5 alkenyl groups with 2 to 12 carbon atoms per molecule, in an amount of 20 to 40 parts by mass;

(B) an organopolysiloxane composed of a $R^1_3SiO_{1/2}$ unit and $SiO_{4/2}$ unit, wherein each $R^1$ represents a monovalent hydrocarbon group with 1 to 12 carbon atoms, having a molar ratio ($R^1_3SiO_{1/2}$ unit)/($SiO_{4/2}$ unit) of 0.6 to 1.7, and having a number average molecular weight (Mn) converted to standard polystyrene of from 1,700 to 3,000, in an amount of 60 to 80 parts by mass, wherein the total amount of components (A) and (B) is 100 parts by mass;

(C) an organohydrogenpolysiloxane having on average at least two silicon-bonded hydrogen atoms per molecule, in an amount such that a molar ratio of the silicon-bonded hydrogen atoms in component (C) per the alkenyl groups in components (A) and (B) becomes 20 to 50; and (D) a hydrosilylation catalyst, in a sufficient amount to promote a hydrosilylation of the present composition.

The silicone pressure-sensitive adhesive composition may comprise: (E) an inhibitor in an amount of from 0.001 to 5 parts by mass per 100 parts by mass of components (A) and (B).

The silicone pressure-sensitive adhesive composition may comprise: a solvent in an amount of from 5 to 400 parts by mass per 100 parts by mass of components (A) through (D).

Advantageous Effects of Invention

The silicone pressure-sensitive adhesive composition of the present invention can be cured into a pressure-sensitive adhesive having a good release force against a release liner, a high tack and a high peel adhesion against general substrates such as glass, PC and PET.

Mode for the Invention

The silicone pressure-sensitive adhesive composition of the present invention will be explained in detail.

Component (A) is a principal curable component of the present composition, and curing thereof proceeds by an addition reaction with component (C) under the catalytic activity of component (D). Component (A) must have on average at least 0.5 alkenyl groups with 2 to 12 carbon atoms per molecule. The alkenyl groups in component (A) are exemplified by vinyl groups, allyl groups, butenyl groups, pentenyl groups, and hexenyl groups. The alkenyl groups are preferably vinyl groups. Silicon-bonded groups other than alkenyl groups in component (A) are not limited, however, are exemplified by monovalent hydrocarbon groups with 1 to 12 carbon atoms free aliphatic unsaturated bond. The monovalent hydrocarbon groups are exemplified by methyl groups, ethyl groups, propyl groups, or similar alkyl group; phenyl groups, tolyl groups, xylyl groups, or similar aryl groups; benzyl groups, phenethyl groups, or similar aralkyl groups; and 3-chloropropyl groups, 3,3,3-trifluoropropyl groups, or similar halogenated alkyl groups. Furthermore, the silicon atoms in component (A) may have small amounts of hydroxyl groups or alkoxy groups such as methoxy groups or ethoxy groups within a range that does not impair the object of the present invention.

The molecular structure of component (A) is straight chain, however, it may be partially branched. The viscosity at 25° C. of component (A) is not limited, however, it is preferably at least 50 Pa·s, and preferably at least 100 Pa·s. In general it is called high viscosity silicone oil or silicone gum.

Component (A) may be a single organopolysiloxane or a mixture of two or more types of organopolysiloxanes. Examples of such component (A) include dimethylpolysiloxanes capped at both molecular terminals with dimethylvinylsiloxy groups, dimethylsiloxane-methylvinylsiloxane copolymers capped at both molecular terminals with dimethylvinylsiloxy groups, dimethylsiloxane-methylphenylsiloxane copolymers capped at both molecular terminals with dimethylvinylsiloxy groups, methylphenylpolysiloxanes capped at both molecular terminals with dimethylvinylsiloxy groups, dimethylsiloxane-methylvinylsiloxane copolymers capped at both molecular terminals with trimethylsiloxy groups, dimethylsiloxane-methylvinylsiloxane-methylphenylsiloxane copolymers capped at both molecular terminals with trimethylsiloxy groups, a mixture of dimethylpolysiloxanes capped at both molecular terminals with dimethylvinylsiloxy groups, and dimethylpolysiloxane capped at one molecular terminal with dimethylvinylsiloxy group and at another molecular terminal with dimethylhydroxysiloxy group, a mixture of dimethylpolysiloxanes capped at both molecular terminals with dimethylvinylsiloxy groups, and dimethylpolysiloxane capped at both molecular terminals with dimethylhydroxysiloxy group, and mixtures of two or more types thereof. However, component (A) must have on average at least 0.5 alkenyl groups per molecule.

Component (B) in the present composition is an organopolysiloxane resin which imparts tack to the cured pressure-sensitive adhesive. In the above formula for the siloxane units of component (B), each $R^1$ represents a monovalent hydrocarbon group with 1 to 12 carbon atoms. The monovalent hydrocarbon groups are exemplified by methyl groups, ethyl groups, propyl groups, or similar alkyl group; vinyl groups, allyl groups, butenyl groups, pentenyl groups, hexenyl groups, or similar alkenyl groups; phenyl groups, tolyl groups, xylyl groups, or similar aryl groups; benzyl groups, phenethyl groups, or similar aralkyl groups; and 3-chloropropyl groups, 3,3,3-trifluoropropyl groups, or similar halogenated alkyl groups. Preferably all of $R^1$ are methyl groups. Component (B) may have residual silanol groups which arise from the hydrolysis of reactive silanes that are used to prepare component (B).

The molar ratio of $R^1_3SiO_{1/2}$ units to $SiO_{4/2}$ units in component (B) falls within the range of 0.6 to 1.7, preferably within the range of 0.6 to 1.5. This is because when the molar ratio is greater than or equal to the lower limit of the aforementioned range, the tackiness of the pressure-sensitive adhesive is improved, and when the molar ratio is less than or equal to the upper limit of the aforementioned range, the cohesive strength is improved.

Component (B) has a number average molecular weight (Mn) converted to standard polystyrene of from 1,700 to 3,000, preferably from 1,700 to 2,800. This is because when the number average molecular weight is greater than or equal to the lower limit of the aforementioned range, the release force of the pressure-sensitive adhesive is improved, and when the number average molecular weight is less than or equal to the upper limit of the aforementioned range, the peel force of the pressure-sensitive adhesive is improved.

Methods for synthesizing such organopolysiloxanes are known. The disclosures of U.S. Pat. Nos. 2,676,182 and 3,284,406 are incorporated herein by reference to show the preparation of organopolysiloxanes which are suitable as component (B) in the present composition.

Component (A) is added in an amount of 20 to 40 parts by mass, and component (B) is added in an amount of 60 to 80 parts by mass, wherein the total amount of components (A) and (B) is 100 parts by mass. This is because when the content of component (B) is greater than or equal to the lower limit of the aforementioned range, the tackiness of the pressure-sensitive adhesive is improved, and when the content of component (B) is less than or equal to the upper limit of the aforementioned range, the cohesive strength is improved.

Component (C) in the present composition is the component which functions as the crosslinker curing agent for component (A) or components (A) and (B). Curing proceeds by the addition reaction of the silicon-bonded hydrogen atoms in this component with the alkenyl groups in component (A) under the catalytic activity of component (D).

Component (C) can be any of the currently known organohydrogenpolysiloxanes having on average at least two silicon-bonded hydrogen atoms per molecule. The molecular structure of component (C) is not limited and can be cyclic, linear, branched and/or network, as desired. Silicon-bonded groups other than hydrogen atoms may be monovalent hydrocarbon groups free aliphatic unsaturated bond. The monovalent hydrocarbon groups are exemplified by methyl groups, ethyl groups, propyl groups, or similar alkyl group; phenyl groups, tolyl groups, xylyl groups, or similar aryl groups; benzyl groups, phenethyl groups, or similar aralkyl groups; and 3-chloropropyl groups, 3,3,3-trifluoropropyl groups, or similar halogenated alkyl groups.

The quantity of component (C) is an amount to provide from 20 to 50 silicon-bonded hydrogen atoms per the alkenyl groups in components (A) and (B). Preferably, the lower limit thereof is 25 silicon-bonded hydrogen atoms per the alkenyl groups in components (A) and (B), while the upper limit thereof is 45, 40, 35, or 30 silicon-bonded hydrogen atoms per the alkenyl groups in components (A) and (B). This is because when the content of component (C) is within the aforementioned range, the present composition can be cured sufficiently.

Component (D) is a platinum-containing catalyst, and it promotes the addition reaction of component (A) with component (C). Component (D) is exemplified by chloroplatinic acid, chloroplatinic acid-olefin complexes, chloroplatinic acid-vinylsiloxane complexes, and platinum supported on a microparticulate carrier such as alumina.

Component (D) is added in a quantity sufficient to enhance a hydrosilylation reaction of the present composition, and preferable in a quantity sufficient to give from 0.1 to 1000, and preferably 1 to 300, parts by mass of platinum for every one million parts by mass of the combined quantity of components (A) through (C). The crosslinking reaction will be unsatisfactory at below 0.1 part by mass, and the cohesive strength will thus be reduced, while exceeding 1,000 parts by mass is disadvantageous due to the resulting short use time and high cost.

In addition to components (A) through (D), an inhibitor (E) known in the art may be added to the present composition. Component (E) is exemplified by 3-methyl-1-butyn-3-ol, 3,5-dimethyl-1-hexyn-3-ol, 3-methyl-1-pentyn-3-ol, 1-ethynyl-1-cyclohexanol, 3-phenyl-1-butyn-3-ol, or a similar alkyne alcohol; 3-methyl-3-penten-1-yne, 3,5-dimethyl-1-hexen-3-yne, or a similar en-yne compound; 1,3,5,7-tetramethyl-1,3,5,7-tetravinylcyclotetrasiloxane, 1,3,5,7-tetramethyl-1,3,5,7-tetrahexenylcyclotetrasiloxane, or a similar methylalkenyl-siloxane compound; alkyl and substituted alkyl maleates, or similar unsaturated ester; or benzotriazole.

The content of component (E) is not limited, but it may be in an amount of 0.001 to 5 part by mass per 100 parts by mass of components (A) and (B).

In addition, the present composition may also contain solvent to dissolve components (A) through (D) so the present composition may be easily applied to various substrates. The solvent is not limited, however, it may be composed of an aromatic solvent, and an aliphatic alcohol with at least three carbon atoms or an aliphatic ester. The aromatic solvent is exemplified by toluene, xylene, and a mixture thereof. The aliphatic alcohol is exemplified by propyl alcohol, isopropyl alcohol, butyl alcohol, isobutyl alcohol, tert-butyl alcohol, and a mixture thereof. The aliphatic alcohol is preferably isopropyl alcohol. The aliphatic ester is exemplified by methyl acetate, ethyl acetate, and a mixture thereof.

The content of the solvent is not limited, but it may be added in a sufficient amount to apply the composition to a substrate. It is preferably in an amount of from 25 to 400 parts by mass or from 50 to 200 parts by mass per 100 parts by mass of components (A) through (D). This is because when the content is greater than or equal to the lower limit of the aforementioned range, the viscosity of the present composition is reduced, and when the content is less than or equal to the upper limit of the aforementioned range, thick silicone pressure-sensitive adhesive layer on a substrate can be formed.

Furthermore, the addition of small quantities of supplementary components to the present composition is permissible. Such supplementary components are, for example, the various antioxidants, pigments, stabilizers, fillers, etc.

The present composition is applied onto a tape-like or a sheet-like substrate and is cured by heating at relatively low temperatures, especially at temperature ranging from 50° C. to 100° C., whereby a pressure-sensitive adhesive layer is formed on the aforementioned substrate. The substrate may be made from different materials such as single paperboard, corrugated paperboard, clay-coated paper, polyolefin-laminated paper, especially polyethylene-laminated paper, synthetic-resin film, natural-fiber web, synthetic-fiber web, artificial leather, or metal foil. The most preferable substrate is a synthetic film, such as polyimide, polyethylene, polypropylene, polystyrene, polyvinylchloride, polycarbonate, polyethylene terephthalate, or Nylon. When heat-resistant properties are essential, it is preferable to use a substrate in the form of a film made from polyimide, polyether-etherketone (PEEK), polyethylene naphthalate (PEN), liquid-crystal polyallylate, polyamidoimide (PAI), polyether sulfone (PES), or a similar heat-resistant synthetic resin.

EXAMPLES

The silicone pressure-sensitive adhesive composition of the present invention will be described in detail hereinafter using Practical Examples and Comparative Examples. However, the present invention is not limited by the description of the below listed Practical Examples. Viscosities were measured at 25° C.

Practical Examples 1 to 7 and Comparative Examples 1 to 4

The silicone pressure-sensitive adhesive compositions shown in Table 1 were prepared using the components mentioned below. Moreover, in Table 1, "SiH/Vi" represents the total moles of silicon-bonded hydrogen atoms in component (C) per 1 mole of total vinyl groups in components (A) and (B), and "R/P" represents the mass ratio of component (B) per component (A).

The following components were used as component (A).

Component (a-1): 25 mass % toluene solution of a gum-like dimethylvinylsiloxy-terminated and partially dimethylhydroxysiloxy-terminated dimethylpolysiloxane (content of vinyl groups: 0.01 mass %)

The following component was used as component (B).

Component (b-1): 71 mass % xylene solution of an organopolysiloxane composed of $(CH_3)_3SiO_{1/2}$ units and $SiO_{4/2}$ units having a molar ratio $[(CH_3)_3SiO_{1/2}$ unit$]/[SiO_{4/2}$ unit$]$ of 1.1, and having a number average molecular weight (Mn) converted to standard polystyrene of 1,800.

Component (b-2): 75 mass % xylene solution of an organopolysiloxane composed of $(CH_3)_3SiO_{1/2}$ units and $SiO_{4/2}$ units having a molar ratio $[(CH_3)_3SiO_{1/2}$ unit$]/[SiO_{4/2}$ unit$]$ of 1.1, and having a number average molecular weight (Mn) converted to standard polystyrene of 7,000.

The following component was used as component (C).

Component (c-1): a methylhydrogensiloxane-dimethylsiloxane copolymer capped at both molecular terminals with trimethylsiloxy groups and having a viscosity of 5 mPa·s (content of silicon-bonded hydrogen atoms: 0.77 mass %)

The following components were used as component (D).

Component (d-1): 1,3-divinyl-1,1,3,3-tetramethyldisiloxane solution of a platinum-1,3-divinyl-1,1,3,3-tetramethyl disiloxane complex (platinum metal content in terms of mass units in this component=approximately 5,300 ppm)

The following components were used as component (E).

Component (e-1): 1-ethynyl-cyclohexan-1-ol

The properties reported in the Examples were measured by the following methods.

[Measurement of Release Force to Tight Side]

A solution of the silicone pressure-sensitive adhesive composition was applied with applicator to a fluoro-silicone release film in sufficient quantity to generate a cured layer of thickness of 50 μm, and the composition was then dried at 70° C. for 2 minutes and cured by heating at 150° C. for 2 minutes, thus forming a silicone pressure-sensitive adhesive. The silicone pressure-sensitive adhesive was bonded to polyethylene terephthalate (PET) film having a thickness of 50 μm without trapping air in the adhesion layer.

The silicone pressure-sensitive adhesive with PET film was cut into a size of 50 mm×150 mm. The PET film of the silicone pressure-sensitive adhesive was bonded to a tensile testing machine by a double side adhesive tape. Then, the peel force at 25° C. when the fluoro-silicone release film was removed by 180° was measured. Herein, the peeling rate was set at 300 mm/min.

[Measurement of 180° Peel Adhesion for Glass or PC]

A silicone pressure-sensitive adhesive with PET film was prepared using the same method as that described for the release force evaluation. The silicone pressure-sensitive adhesive with PET film was cut into a size of 25 mm×150 mm. After peeling of the fluoro-silicone release film, the silicone pressure-sensitive adhesion was adhered to glass or polycarbonate (PC) by the use of 2 kg rubber roller. After 30 minutes later, 180° peel adhesion was measured by the tensile testing machine. Herein, the peeling rate was set at 300 mm/min.

[Measurement of T-Peel Adhesion for PET]

A silicone pressure-sensitive adhesive with PET film was prepared using the same method as that described for the release force evaluation. The silicone pressure-sensitive adhesive with PET film was cut into a size of 25 mm×150 mm. After peeling of the fluoro-silicone release film, the silicone pressure-sensitive adhesive was adhered to another 2 mm PET film by the use of 2 kg rubber roller. After 30 minutes later, 180° peel adhesion was measured by the tensile testing machine. Herein, the peeling rate was set at 300 mm/min.

[Measurement of Probe Tack]

A silicone pressure-sensitive adhesive with PET film was prepared using the same method as that described for the release force evaluation. The tack at 25° C. of the silicone pressure-sensitive adhesive was measured using a probe tack tester (Model PT-1000 produced by ChemInsturuments, Inc.) in accordance with ASTM D 2979 "Standard Test Method for Pressure-Sensitive Tack of Adhesives Using an Inverted Probe Machine". Measurement condition was as follows:

peel speed: 1 cm/min.
rod: 3 mm diameter stainless steel rod
load: 100 g
dwell time: 1 sec.

[Measurement of Rheology]

A silicone pressure-sensitive adhesive with PET film was prepared using the same method as that described for the peel force evaluation. Glass transition point (Tg) and storage modulus (G') at 25° C. of the silicone pressure-sensitive adhesive was measured using a rheometer (AR-G2 Magnetic Bearing Rheometer produced by TA Instruments Ltd.) under the following conditions.

disc having a diameter of 8 mm
ramp rate of 5° C./min from −60 to 120° C.
frequency of 6.28 rad/sec (1 Hz)
strain 0.05%
thickness of the specimen of 0.5 to 1.0 mm

TABLE 1

| | | | Prac. Exam 1 | Prac. Exam 2 | Prac. Exam 3 | Prac. Exam 4 | Prac. Exam 5 | Prac. Exam 6 | Prac. Exam 7 |
|---|---|---|---|---|---|---|---|---|---|
| Silicone Pressure-sensitive Adhesive Composition (parts by mass) | (A) | (a-1) | 100 | 100 | 100 | 100 | 100 | 100 | 100 |
| | (B) | (b-1) | 55 | 65 | 75 | 85 | 95 | 110 | 125 |
| | | (b-2) | — | — | — | — | — | — | — |
| | (C) | (c-1) | 0.5 | 0.5 | 0.5 | 0.5 | 0.5 | 0.5 | 0.5 |
| | (D) | (d-1) | 0.5 | 0.5 | 0.5 | 0.5 | 0.5 | 0.5 | 0.5 |
| | (E) | (e-1) | 0.1 | 0.1 | 0.1 | 0.1 | 0.1 | 0.1 | 0.1 |
| SiH/Vi | | | 41 | 41 | 41 | 41 | 41 | 41 | 41 |
| R/P | | | 1.56 | 1.85 | 2.13 | 2.41 | 2.70 | 3.12 | 3.55 |
| Release force to tight side (gf/inch) | | | 304 | 404 | 31 | 3 | 3 | 4 | 2 |
| 180° peel adhesion for glass (gf/inch) | | | 1590 | 1977 | 2391 | 3042 | 3547 | 2425 | 3116 |
| 180° peel adhesion for PC (gf/inch) | | | 1423 | 1748 | 2125 | 2267 | 3520 | 3789 | 3607 |
| T-peel adhesion for PET (gf/inch) | | | 833 | 1222 | 1208 | 1468 | 1855 | 1835 | 1777 |
| Probe tack (gf) | | | 492 | 698 | 686 | 229 | 41 | 32 | 1.5 |
| Rheology | Tg (° C.) | | −29 | −1.6 | 20 | 33.4 | 49.3 | 55.9 | 69.2 |
| | G' (MPa) | | 0.0303 | 0.0317 | 0.088 | 0.23 | 0.87 | 1.62 | 2.95 |

| | | | Comp. Exam 1 | Comp. Exam 2 | Comp. Exam 3 | Comp. Exam 4 |
|---|---|---|---|---|---|---|
| Silicone Pressure-sensitive Adhesive Composition (parts by mass) | (A) | (a-1) | 100 | 100 | 100 | 100 |
| | (B) | (b-1) | — | — | — | — |
| | | (b-2) | 50 | 60 | 70 | 80 |
| | (C) | (c-1) | 0.5 | 0.5 | 0.5 | 0.5 |
| | (D) | (d-1) | 0.5 | 0.5 | 0.5 | 0.5 |
| | (E) | (e-1) | 0.1 | 0.1 | 0.1 | 0.1 |
| SiH/Vi | | | 41 | 41 | 41 | 41 |
| R/P | | | 1.50 | 1.70 | 1.99 | 2.27 |
| Release force to tight side (gf/inch) | | | 41 | 3 | 2.4 | 1.5 |
| 180° peel adhesion for glass (gf/inch) | | | 1251 | 1750 | 2170 | 0 |
| 180° peel adhesion for PC (gf/inch) | | | 1256 | 1522 | 1873 | 0 |

TABLE 1-continued

| | | | | |
|---|---|---|---|---|
| T-peel adhesion for PET (gf/inch) | 351 | 570 | 85 | 1 |
| Probe tack (gf) | 77 | 1.3 | 1.2 | 1.2 |
| Rheology Tg (° C.) | 28 | 69 | 96 | 112.5 |
| G' (MPa) | 0.37 | 2.11 | 5.17 | 8.39 |

Based on the results in Table 1, it was found that the organopolysiloxane composed of $(CH_3)_3SiO_{1/2}$ units and $SiO_{4/2}$ with Mn of 1,800 provided the silicone pressure-sensitive adhesive with a good release force against a release liner, a high tackiness and a high peel adhesion against general substrates such as glass, polycarbonate (PC) and polyethylene terephthalate (PET) in the same R/P ratio.

INDUSTRIAL APPLICABILITY

The silicone pressure-sensitive adhesive composition of the present invention is useful in preparing articles such as pressure-sensitive tapes, labels, emblems and other decorative or informational signs.

The invention claimed is:

1. A silicone pressure-sensitive adhesive composition comprising:
   (A) a diorganopolysiloxane having on average at least 0.5 alkenyl groups with 2 to 12 carbon atoms per molecule, in an amount of 20 to 40 parts by mass;
   (B) an organopolysiloxane composed of $R^1_3SiO_{1/2}$ and $SiO_{4/2}$ units, wherein each $R^1$ represents a monovalent hydrocarbon group with 1 to 12 carbon atoms, having a molar ratio ($R^1_3SiO_{1/2}$ unit)/($SiO_{4/2}$ unit) of 0.6 to 1.7, and having a number average molecular weight (Mn) converted to standard polystyrene of from 1,700 to 3,000, in an amount of 60 to 80 parts by mass, wherein the total amount of components (A) and (B) is 100 parts by mass;
   (C) an organohydrogenpolysiloxane having on average at least two silicon-bonded hydrogen atoms per molecule, in an amount such that a molar ratio of the silicon-bonded hydrogen atoms in component (C) per the alkenyl groups in components (A) and (B) becomes 20 to 50; and
   (D) a hydrosilylation catalyst, in a sufficient amount to promote a hydrosilylation of the present composition.

2. The silicone pressure-sensitive adhesive composition of claim 1, further comprising (E) an inhibitor in an amount of from 0.001 to 5 parts by mass per 100 parts by mass of components (A) and (B).

3. The silicone pressure-sensitive adhesive composition of claim 1, further comprising a solvent in an amount of from 5 to 400 parts by mass per 100 parts by mass of components (A) through (D).

4. The silicone pressure-sensitive adhesive composition of claim 2, further comprising a solvent in an amount of from 5 to 400 parts by mass per 100 parts by mass of components (A) through (D).

5. The silicone pressure-sensitive adhesive composition of claim 1, further comprising (E) an inhibitor, a solvent, or a combination thereof.

6. A pressure-sensitive adhesive formed from the silicone pressure-sensitive adhesive composition according to claim 1.

* * * * *